(12) United States Patent
Kuwata et al.

(10) Patent No.: US 9,565,395 B1
(45) Date of Patent: Feb. 7, 2017

(54) VIDEO IMAGE PROCESSING APPARATUS AND RECORDING MEDIUM

(71) Applicants: Koji Kuwata, Kanagawa (JP);
Tomoyuki Goto, Kanagawa (JP);
Hiroaki Uchiyama, Kanagawa (JP);
Kiyoto Igarashi, Kanagawa (JP);
Kazuki Kitazawa, Kanagawa (JP);
Masato Takahashi, Tokyo (JP);
Nobumasa Gingawa, Kanagawa (JP)

(72) Inventors: Koji Kuwata, Kanagawa (JP);
Tomoyuki Goto, Kanagawa (JP);
Hiroaki Uchiyama, Kanagawa (JP);
Kiyoto Igarashi, Kanagawa (JP);
Kazuki Kitazawa, Kanagawa (JP);
Masato Takahashi, Tokyo (JP);
Nobumasa Gingawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/196,221

(22) Filed: Jun. 29, 2016

(30) Foreign Application Priority Data

Jul. 16, 2015 (JP) ................. 2015-142504

(51) Int. Cl.
*H04N 7/14* (2006.01)
*H04N 7/15* (2006.01)
*H04N 19/107* (2014.01)
*H04N 19/17* (2014.01)
*H04N 19/85* (2014.01)
*H04N 21/233* (2011.01)
*H04N 21/2383* (2011.01)

(52) U.S. Cl.
CPC .............. *H04N 7/15* (2013.01); *H04N 19/107* (2014.11); *H04N 19/17* (2014.11); *H04N 19/85* (2014.11); *H04N 21/233* (2013.01); *H04N 21/2383* (2013.01)

(58) Field of Classification Search
CPC ........................................................ H04N 7/14
USPC ................... 348/14.01, 14.12, 14.13, 14.16
See application file for complete search history.

(56) References Cited

U.S. PATENT DOCUMENTS

| 5,959,667 A | 9/1999 | Maeng |
| 6,618,073 B1 | 9/2003 | Lambert et al. |

(Continued)

FOREIGN PATENT DOCUMENTS

| JP | 3173257 | 6/2001 |
| JP | 2002-305733 | 10/2002 |
| JP | 2014-200076 | 10/2014 |

*Primary Examiner* — Olisa Anwah
(74) *Attorney, Agent, or Firm* — IPUSA, PLLC

(57) ABSTRACT

A video image processing apparatus including, a generation unit configured to generate a video image frame from an image area to be used included in a video image captured by a camera, a spatial area in the video image being defined by the image area to be used, an encoding unit configured to encode the video image frame into any one of a first video image frame and a second video image frame, and a detection unit configured to detect a trigger for changing the image area to be used to report the detection of the trigger to the generation unit, wherein the encoding unit reports a encoded video image frame type to the generation unit in advance, and in response to receiving the detection of the trigger, the generation unit changes the image area to be used in a video image frame based on the reported type.

7 Claims, 7 Drawing Sheets

(56) References Cited

U.S. PATENT DOCUMENTS

| | | |
|---|---|---|
| 6,943,819 B2 | 9/2005 | Takaki et al. |
| 7,113,201 B1 | 9/2006 | Taylor et al. |
| 7,117,157 B1 | 10/2006 | Taylor et al. |
| 7,675,539 B2 | 3/2010 | Matsui |
| 8,044,990 B2 | 10/2011 | Kawaguchi |
| 8,111,282 B2 | 2/2012 | Cutler et al. |
| 8,234,113 B2 | 7/2012 | Zhang et al. |
| 8,248,448 B2 | 8/2012 | Feng et al. |
| 8,314,829 B2 | 11/2012 | Cutler |
| 8,330,787 B2 | 12/2012 | Cutler |
| 8,358,328 B2 | 1/2013 | Friel et al. |
| 8,395,653 B2 | 3/2013 | Feng et al. |
| 8,433,061 B2 | 4/2013 | Cutler |
| 8,510,110 B2 | 8/2013 | Zhang et al. |
| 9,030,520 B2 | 5/2015 | Chu et al. |
| 9,084,068 B2 | 7/2015 | Abrahamsson et al. |
| 9,363,623 B2 | 6/2016 | Nakamura |
| 2008/0246833 A1 | 10/2008 | Yasui et al. |
| 2011/0285807 A1 | 11/2011 | Feng |
| 2013/0271559 A1 | 10/2013 | Feng et al. |
| 2014/0049595 A1* | 2/2014 | Feng ................... H04N 7/15 348/14.08 |
| 2014/0376740 A1 | 12/2014 | Shigenaga et al. |
| 2015/0023524 A1 | 1/2015 | Shigenaga et al. |
| 2015/0046581 A1 | 2/2015 | Inoue |
| 2015/0047002 A1 | 2/2015 | Tamura |
| 2015/0071130 A1 | 3/2015 | Okuyama |
| 2015/0133106 A1 | 5/2015 | Nakamura |
| 2015/0146078 A1 | 5/2015 | Aarrestad et al. |
| 2015/0149909 A1 | 5/2015 | Nakamura et al. |
| 2015/0149990 A1 | 5/2015 | Nakamura |
| 2016/0021405 A1 | 1/2016 | Kasatani |

\* cited by examiner

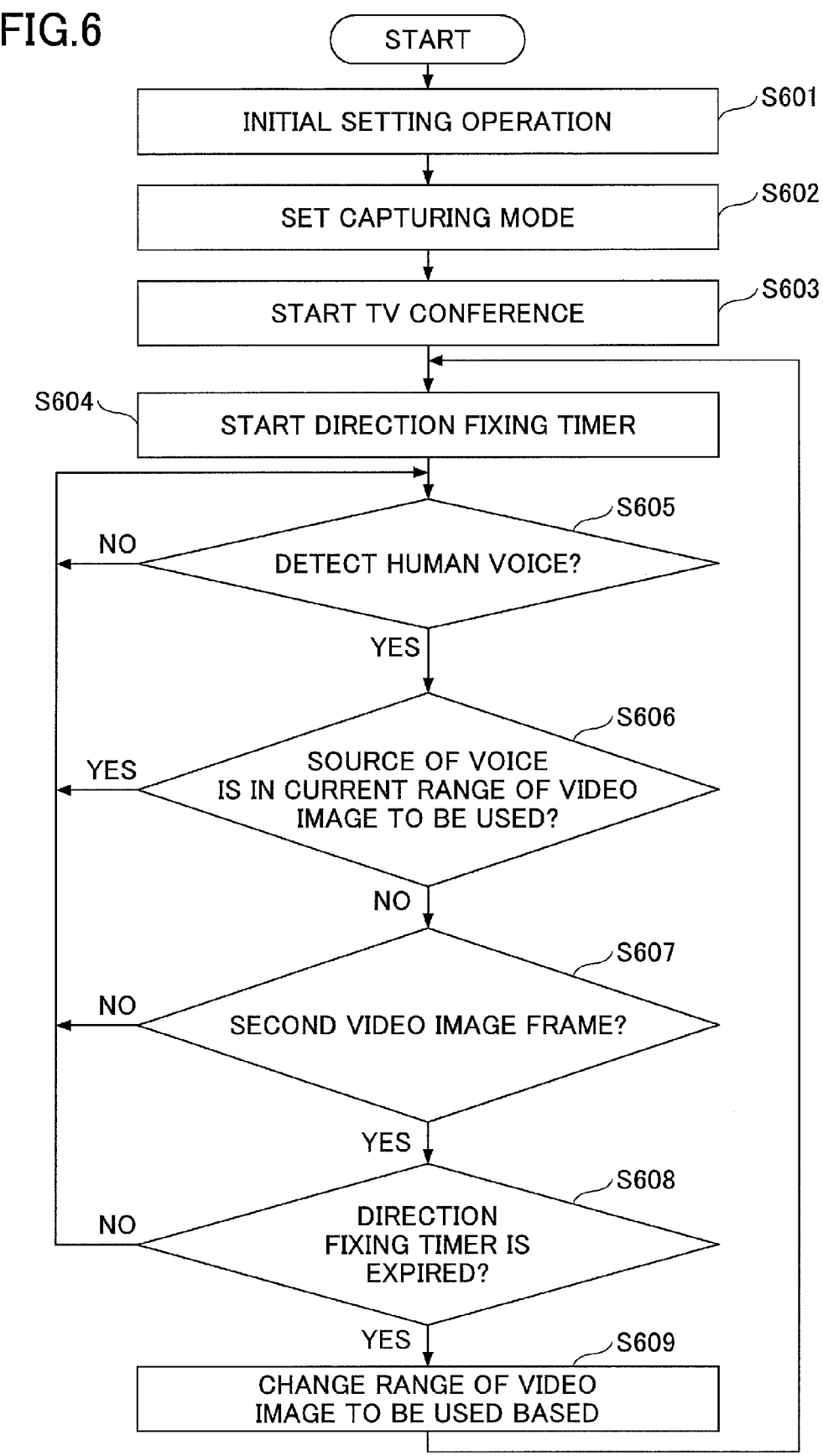

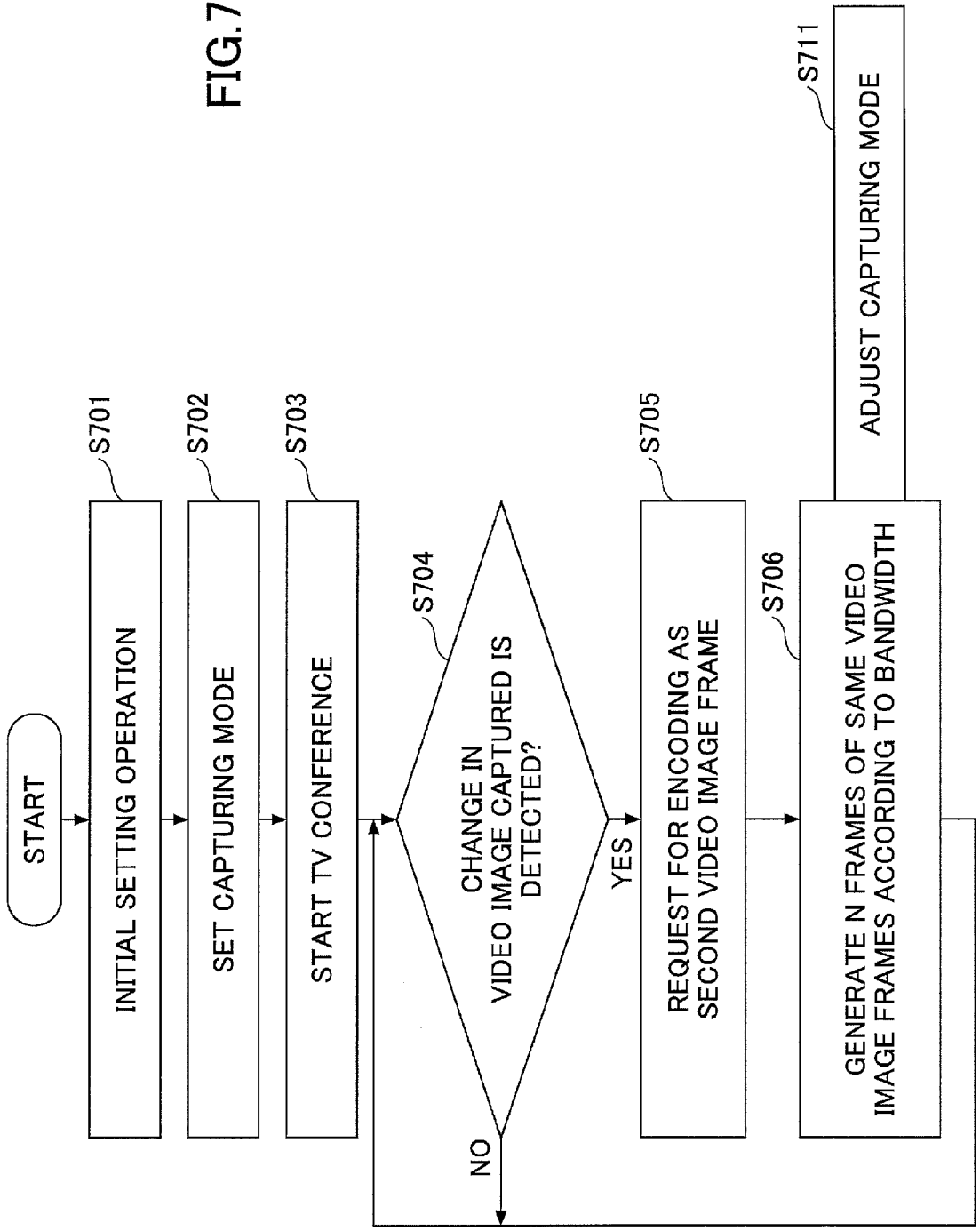

VIDEO IMAGE PROCESSING APPARATUS AND RECORDING MEDIUM

BACKGROUND OF THE INVENTION

1. Field of the Invention

The present disclosure relates to video image processing apparatuses and recording media.

2. Description of the Related Art

A method of TV conference system is now distributed, in which a wide range of video image (image area) is captured by a camera including a wide-angle lens, and the displayed video image is generated from the captured video image.

In the method, in response to detecting that an object to be displayed is changed, a display range of the displayed video image is changed so as to include the object in the displayed video image.

The object to be displayed is changed in accordance with a state of the TV conference, regardless of current display range of the displayed video image. In the TV conference system, etc., encoding process is performed using inter-frame prediction. Therefore, when the object to be displayed is changed, the coding process cannot be performed effectively.

In order to solve the above described problem, a method is proposed, in which the inter-frame prediction is stopped, and instead, intra-frame prediction is used to perform the coding process in response to the change of the object to be displayed (e.g., Japanese Unexamined Patent Application Publication No. 2002-305733). However, in a case where the intra-frame prediction is used to perform the encoding process, transmission efficiency of the video image is degraded.

RELATED ART DOCUMENT

Patent Document

[Patent Document 1]: Japanese Unexamined Patent Application Publication No. 2002-305733

SUMMARY OF THE INVENTION

An object of the present disclosure is to improve an efficiency of the coding process when the object to be displayed is changed while suppressing degradation in the transmission efficiency of the video image.

The following configuration is adopted to achieve the aforementioned object.

In one aspect of the embodiment of the present disclosure, there is provided a video image processing apparatus including, a generation unit configured to generate a video image frame from an image area to be used included in a video image captured by a camera, a spatial area in the video image being defined by the image area to be used, an encoding unit configured to encode the video image frame into any one of a first video image frame and a second video image frame, wherein the first video image frame is generated through an encoding operation using inter-frame prediction, and the second video image frame is generated through an encoding operation using intra-frame prediction, and a detection unit configured to detect a trigger for changing the image area to be used to report the detection of the trigger to the generation unit, wherein the encoding unit reports a encoded video image frame type indicative of any one of the first video image frame and the second video image frame to the generation unit in advance, and in response to receiving the detection of the trigger, the generation unit changes the image area to be used in a video image frame based on the reported encoded video image frame type.

Other objects, features and advantages of the present disclosure will become apparent from the following detailed description when read in conjunction with the accompanying drawings.

BRIEF DESCRIPTION OF THE DRAWINGS

FIG. 6 is a flowchart illustrating an example operation of the present embodiment in a case where the range of video image to be used is changed.

FIG. 7 is a flowchart illustrating an example operation of the present embodiment in a case where the video image captured by the camera is changed.

DETAILED DESCRIPTION OF THE PREFERRED EMBODIMENTS

First Embodiment

<System Configuration and Functional Configuration>

(1) General Arrangement of System

A video image processing system 100 will be described with reference to FIG. 1.

Figure 1:
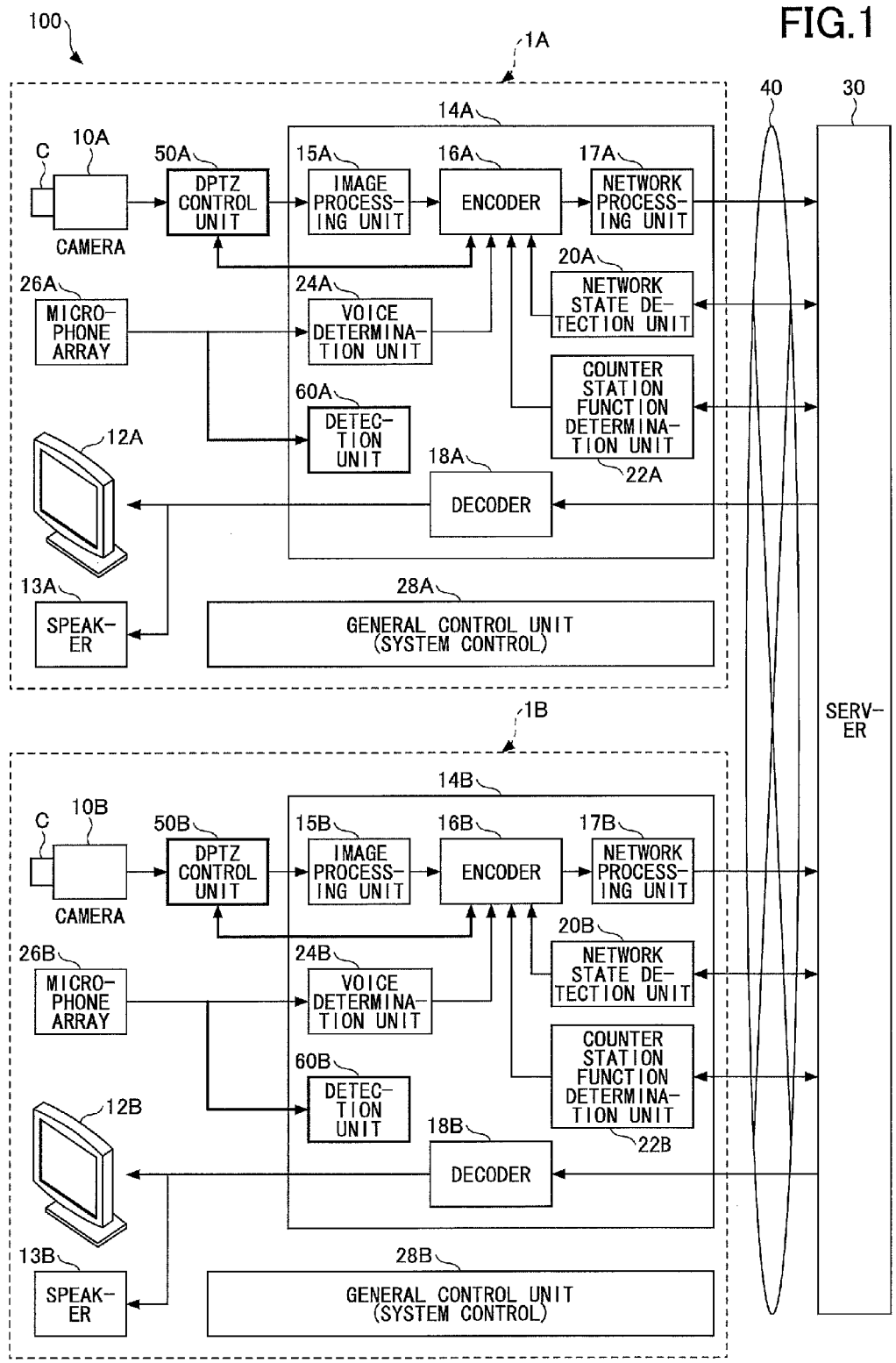
FIG. 1 is a diagram illustrating a video image processing system of an embodiment of the present disclosure.

In FIG. 1, two video image processing apparatuses 1 are connected via a network 40 and a server 30. Although two video image processing apparatuses 1 are illustrated in FIG. 1, three or more video image processing apparatuses 1 may be connected via a network 40 and a server 30.

In a case where the video image processing apparatus 1A is used at a transmission side, and the video image processing apparatus 1B is used at a reception side, video image captured by the video image processing apparatus 1A is transmitted to the video image processing apparatus 1B via a network 40 and a server 30.

(2) Functional Configuration of Video Image Processing Apparatus (General Arrangement)

A functional configuration of the video image processing apparatus 1 will be described with reference to FIG. 1.

The video image processing apparatus 1 includes a camera 10, a display 12, a speaker 13, a microphone array 26, a DPTZ (Digital Pan Tilt Zoom) control unit 50, a terminal apparatus 14 and a general control unit (system control) 28.

The terminal apparatus 14 includes an image processing unit 15, an encoder 16, a network processing unit 17, a decoder 18, a network state detection unit 20, a counter station function determination unit 22, a voice determination unit 24, and a detection unit 60.

The camera 10 captures video images, and transmits the captured video images to the DPTZ control unit 50. The DPTZ control unit 50 generates frames of video images by selecting a range to be used from the video image captured by the camera 10, and transmits the generated frames to the terminal apparatus 14.

The microphone array 26 receives sound input, and transmits sound data corresponding to the received sound to the terminal apparatus 14.

The terminal apparatus 14 encodes received frames of the video image and received sound data, thereby transmitting the encoded data to the video image processing apparatus 1.

The terminal apparatus 14 decodes the encoded frames of the video image and the encoded sound data transmitted from the video image processing apparatus 1 of a communication counterpart. The decoded frames of the video image and the decoded sound data are output to the display 12 and the speaker 13.

The display 12 displays video image of the frames received from terminal apparatus 14. The speaker 13 outputs sound of the sound data received from terminal apparatus 14.

In the following, the functional configuration of the video image processing apparatus 1 will be described, where a relationship between the DPTZ control unit 50 and the encoder 16 is mainly described. Additionally, the DPTZ control unit 50 is an example of generation unit.

The DPTZ control unit 50 generates frames of video image by selecting a range to be used from the video image captured by the camera 10. Here, the range to be used is defined as a spatial range in the video image.

The encoder 16 receives the frames of the video image from the DPTZ control unit 50 via the image processing unit 15. The encoder 16 encodes the frames of the video image, where the encode operation is performed by using inter-frame prediction to generate a first video image frame and using intra-frame prediction to generate a second video image frame.

Here, the first video image frame (the video image frame encoded in a first video image frame type) may be a P (Predicted Frame) frame encoded through forward prediction, or may be a B (Bi-directional Predicted Frame) frame encoded through forward prediction and backward prediction. Additionally, the B frame is unlikely used in the TV conference that requires real time response, etc., because of large encoding delay for the B frame.

The second video image frame (the video image frame encoded in a second video image frame type) is an I (Intra-coded Frame) frame encoded without using the inter-frame prediction The detection unit 60 detects a trigger used for changing a range of video image (image area) to be used, and reports the detection of the trigger to the DPTZ control unit 50.

The trigger means an occurrence of sound, an appearance of a person, and the like. For example, in a case where a speaker (a person who is currently speaking) changes during the TV conference, the detection unit 60 detects the change of the speaker. In a case where the detection unit 60 detects that a different person is now speaking, the range of video image to be used is determined to include a new speaker. Also, in a case where the video image processing apparatus 1 is used for monitoring, the detection unit 60 detects that a person appears in a monitoring range. In a case where an appearance of a person is detected, the range of video image to be used is determined to include the detected person.

The encoder 16 reports the type of the video image frame to the DPTZ control unit 50 in advance.

In response to receiving the trigger, the DPTZ control unit 50 changes the range of video image to be used to be used based on the reported video image frame type.

Preferably, the DPTZ control unit 50 changes the range of video image to be used at timing when one of second video image frames is input.

That is, preferably, the DPTZ control unit 50 recognizes the video image frame type reported from the encoder 16 in advance, and changes the range of video image to be used in one of the second video image frames input to the encoder 16.

When the range of video image to be used is changed in the second video image frame, encoding efficiency is not degraded. Also, a number of the second video image frames is not increased. Therefore, degradation of the transmission efficiency of the video image due to increase of the second video image frames can be avoided.

The DPTZ control unit 50 may change the range of video image to be used in response to receiving the trigger. In this case, the DPTZ control unit 50 transmits information indicating that the range of video image to be used is changed to the encoder 16.

Preferably, the encoder 16 encodes a video image frame that is output just after receiving the information indicative of the change of the range of video image into the second video image frame.

Also, the DPTZ control unit 50 may generate N frames subsequent to the first output frame as the same video image frames. Additionally, "N" is an arbitrary natural number.

The encoder 16 encodes the N frames subsequent to the first output frame by using inter-frame prediction. Therefore, encoding efficiency of the N frames is not degraded. Although, a number of the second video image frames increases by 1, the degradation of the transmission efficiency can be suppressed because the subsequent N frames are generated as the same video image frames.

Additionally, when the video image processing apparatus 1 reports the video image processing apparatus 1 of the communication counterpart that the same continuous N frames are generated, the N frames themselves do not need to be transmitted to the video image processing apparatus 1 of the communication counterpart.

The general control unit 28 performs setting operation of respective functional units of the video image processing apparatus 1 in accordance with a user's instruction, and performs status management operation, and the like.

The microphone array 26 collects the sound, and transmits data of the collected sound to the detection unit 60 and the voice determination unit 24. Additionally, the microphone array 26 may be formed by a plurality of microphone elements.

The display 12 displays the video image of the video image frames transmitted from the video image processing apparatus 1 of the communication counterpart.

The speaker 13 outputs sound of the sound data transmitted from the video image processing apparatus 1 of the communication counterpart.

The image processing unit 15 performs an image processing on the video image frames received from the DPTZ control unit 50. Specific contents of the image processing will be described below.

The voice determination unit 24 forwards the sound data received from the microphone array 26 to the encoder 16. The voice determination unit 24 may extract data corresponding to voice from the sound data to transmit the extracted data to the encoder 16. The encoder 16 encodes the received sound data.

The network state detection unit 20 detects a state of the network 40, and reports the detected state to the encoder 16. For example, the network state of the network 40 indicates a degree of congestion.

The counter station function determination unit 22 acquires information related to decoding function, etc., of the video image processing apparatus 1 of the communication counterpart, and reports the acquired information to the encoder 16.

The encoder 16 determines a transmission mode based on information acquired from the network state detection unit 20, the counter station function determination unit 22, and the voice determination unit 24 to transmit the encoded video image frames and sound data to the network processing unit 17.

The network processing unit 17 transmits the encoded video image frames and encoded sound data received from the encoder 16 to the video image processing apparatus 1 of the communication counterpart.

The decoder 18 decodes the video image frames and sound data received from the video image processing apparatus 1 of the communication counterpart to transmit the decoded video image frames to the display 12 and to transmit the decoded sound data to the speaker 13.

Additionally, a function in which the camera 10 and the DPTZ control unit 50 are integrated may be referred to as a camera module. The encoder 16 is an example of encoding unit.

(3) Functional Configuration of Video Image Processing Apparatus (Setting Range of Video Image to be Used)

Figure 2:
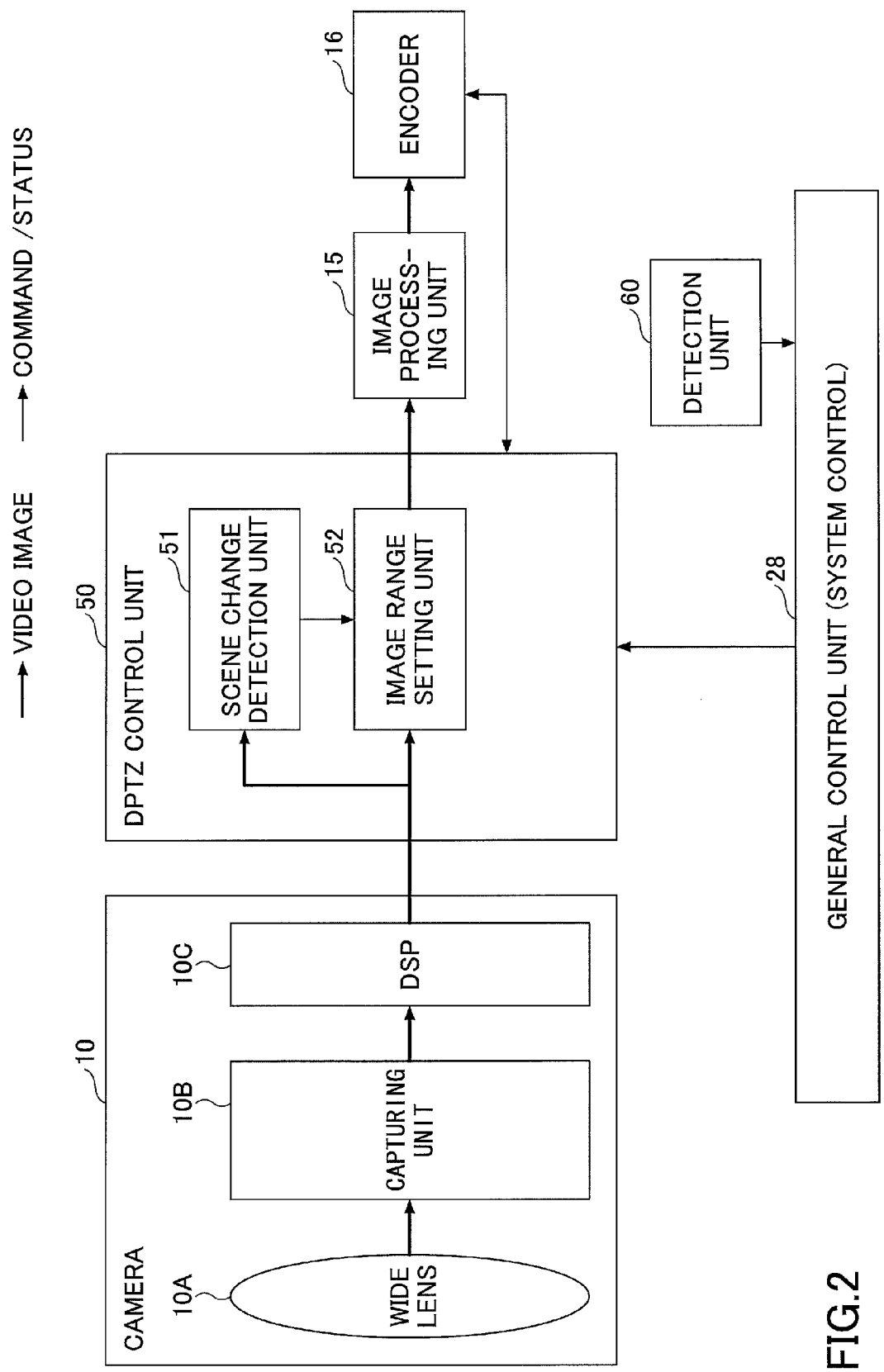
FIG. 2 is a diagram illustrating example functional operations related to change of range of video image to be used.

Operations of respective units for setting the range of video image to be used will be described with reference to FIG. 2.

The camera 10 includes a wide-angle lens 10A, a capturing unit 10B, and a DSP (Digital Signal Processor) 100.

First, an internal configuration of the camera 10 will be described. The capturing unit 10B captures wider video image by using the wide-angle lens 10A in comparison to the image captured by a usual lens, and transmits data of the captured video image to the DSP 100. The DSP 100 performs a digital signal processing on the captured data, and transmits the video image frames generated through the digital signal processing to the DPTZ control unit 50.

In the following, configuration of the DPTZ control unit 50 will be described. The DPTZ control unit 50 includes a scene change detection unit 51 and a image range setting unit 52.

The image range setting unit 52 selects the range used in the video image (range of video image to be used) received from the camera 10, and transmits the selected range to the image processing unit 15. The range of video image to be used can be dynamically set on a frame-by-frame basis. The range of video image to be used is set based on an instruction of the general control unit 28.

The change of the range of video image to be used causes the user to feel as if the camera 10 dynamically moved up-down, or left-right to change an object to be captured by the camera 10. The change of the range of video image to be used may be referred to as "digital-pan/tilt".

A size of the range of video image to be used is determined based on a zoom magnification setting and resolution of the video image transmitted to the video image processing apparatus 1 of the communication counterpart.

The scene change detection unit 51 analyzes the video image received from the camera 10 to detect a change of an object to be captured by the camera 10. For example, the scene change detection unit 51 creates a histogram of respective video image frames received from the camera 10, and the scene change detection unit 51 may detect the trigger based on a change of the created histogram to report the trigger to the image range setting unit 52.

Additionally, the detection unit may be a unit in which the scene change detection unit 51 and the detection unit 60 are integrated.

The general control unit 28 reports coordinate information of the range of video image to be used to the image range setting unit 52. Additionally, an operation for changing the range of video image to be used may be performed in response to the user's operation in the video image processing apparatus 1 of the communication counterpart as well as the user's operation in the video image processing apparatus 1.

The general control unit 28 determines whether the source of a voice is included in the current range of video image to be used in response to receiving a report related to the detection of the voice from the detection unit 60.

In a case where the source of the voice is not included in the current range of video image to be used, an instruction to change the range of video image to be used is given to the DPTZ control unit 50.

The detection unit 60 detects the position and the direction of the source of the voice based on information of the voice input from the microphone array 26. The detection unit 60 reports the detected position and the direction to the general control unit 28.

Additionally, a method of detection may be arbitrarily chosen. For example, a known method of detection may be used. The detection unit 60 is achieved by a DSP, etc., using the chosen method of detection. For example, operation concept of the microphone array 26 is described with regard to the detection of the source of the voice. A microphone array in which 8 microphones are arranged in a line is exemplified. In the microphone array, sound signals output from respective microphones are delayed by delay devices (a plurality of delay devices are provided for each of the microphones). Directionality can be controlled by adding the delayed sound signals by an adder. Spot1 is a main point for collecting the sound signal, where the main point is set in a space. Spot2 (left side of the main point) and Spot3 (right side of the main point) are search points for searching a position of the sound source, where the search point is set in the space.

The sound signals respectively output from the microphones are amplified by amplifiers, and an "A"-th delay devices adds a delay to the sound signals. The sound signals delayed by the delay devices are added by an adder to become a main signal.

An amount of the delay added by the "A"-th delay devices are set so that the sound signals from the Spot1 collected by the respective microphones have the same phase when the sound signals are added by the adder X. Thus, the sound signals from the main point Spot1 reaching the respective microphones are emphasized.

On the other hand, the sound signals coming from directions other than the direction of Spot1 are not so emphasized as the sound signal coming from the direction of Spot1 because the sound signals coming from other directions have time differences other than the time difference corresponding to Spot1, and sound signals coming from other directions do not have the same phase when the sound signals are added after the collection. Thus, the directionality is set to be sensitive to the direction of the main point Spot1.

Sound signals delayed by "B"-th delay device are added by the adder Y to generate a search signal Out2. An amount of the delay added by the "B"-th delay devices are set so that the sound signals from the search point Spot2 collected by the respective microphones have the same phase when the sound signals are added by the adder Y. For example, a position of Spot2 is set in right side of the Spot1 viewed from the microphone array.

On the other hand, sound signals delayed by "C"-th delay device are added by the adder Z to generate a search signal Out3. The amount of the delay added by the "C"-th delay devices are set so that the sound signals from the search point Spot3 collected by the respective microphones have the same phase when the sound signals are added by the adder Z. A position of Spot3 is set in left side of the Spot1 viewed from the microphone array. Also, Spot2 and Spot3 are set so as to be line symmetry with respect to a line L1 connecting a center point C of the microphone array and Spot1. That is, an angle between line L1 and line L2 connecting the center point C and Spot2 is θ, and an angle between line L1 and line L3 connecting the center point C and Spot3 is θ.

For example, in a case where the sound source is located in the direction of Spot1, the main signal Out1 increases, whereas the level of the Out1 decreases as the sound source moves left or right. On the other hand, levels of the search signals Out2 and Out3 are the same when the sound source is located in the direction of Spot1, whereas the level of Out2 increases and level of Out3 decreases as the sound source moves in a negative direction (direction of Spot2). Also, the level of Out3 increases and level of Out2 decreases as the sound source moves in a positive direction (direction of Spot3). Hence, the direction of the sound source, that is, the source of the voice, can be detected by detecting the difference between levels of the search signals Out2 and Out3.

As described above, a first directionality for collecting sound in the direction of the sound source is set based on the detected difference between levels of the search signals Out2 and Out3. Therefore, sound from the sound source can be corrected even if the sound source moves. Also, upon the first directionality (main point Spot1) changing in accordance with a position of the sound source, a second directionality (search point Spot2) and a third directionality (search point Spot3) for searching the sound source are also changed. Therefore, sensitivity of sound source detection can be optimized in accordance with the position of the sound source, that is, the source of the voice.

The encoder 16 reports the type of the video image frame corresponding to respective video image frames to the DPTZ control unit 50. Also, in response to the report of the change of the range of video image to be used from the DPTZ control unit 50, the encoder 16 may generate a video image frame output just after the report as the second video image frame.

(3) Timing of Change of Range of Video Image to be Used

Timing of the change of the range of video image to be used will be described with reference to FIG. 3.

Figure 3:
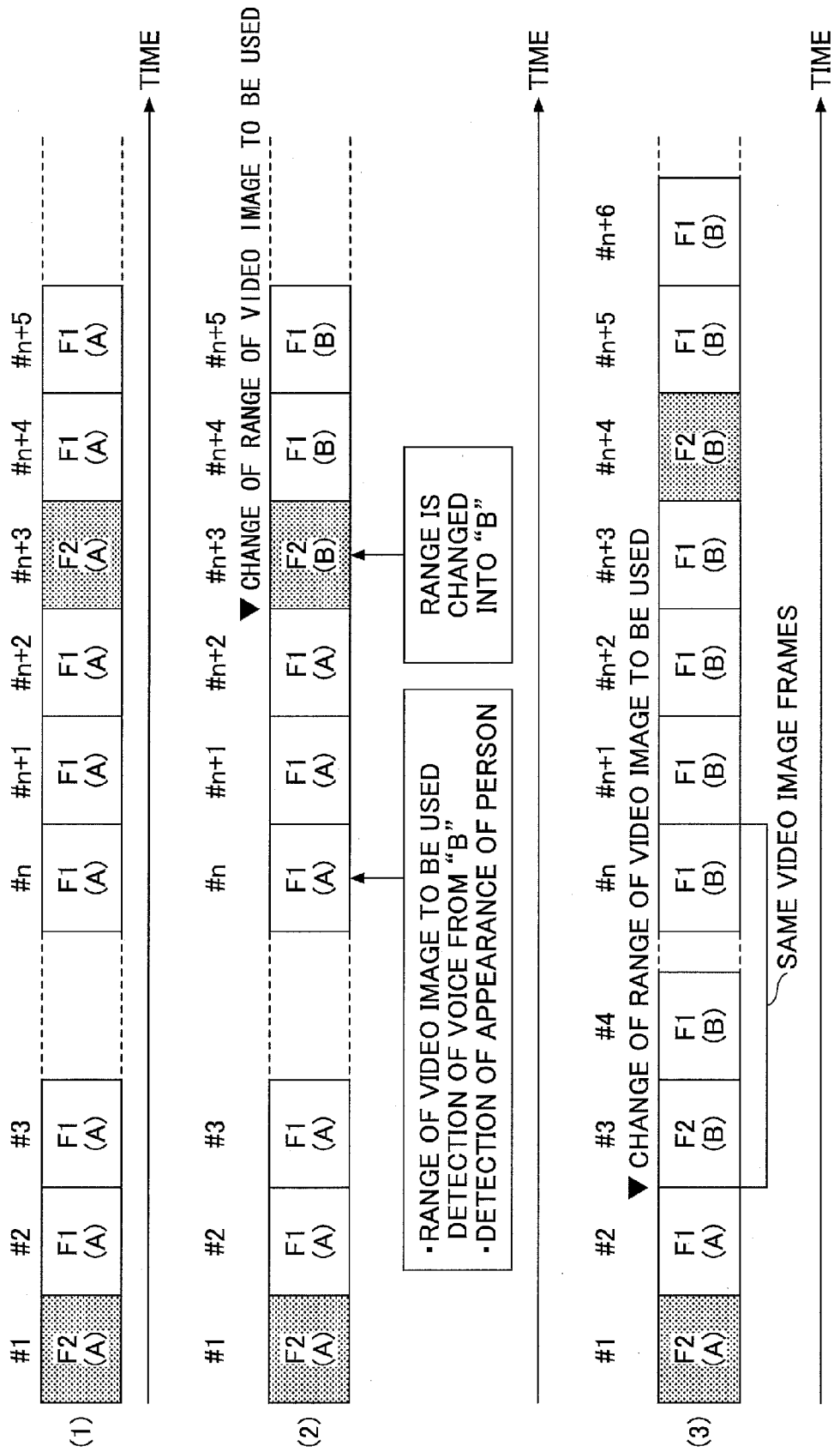
FIG. 3 is a diagram illustrating an example timing at which the range of video image to be used is changed.

FIG. 3(1) illustrates transmission of video image frames from the encoder 16 to the video image processing apparatus 1 of the communication counterpart, where the encoder 16 receives the video image frames from the DPTZ control unit 50, and encodes the received frames to generate a frame of the first video image frame or a frame of the second video image frame. F1 indicates the first video image frame, and F2 indicates the second video image frame. Also, "A" indicates the range of video image to be used in the video image frame received from the camera 10.

In FIG. 3(1), the first video image frame and the second video image frame are repeatedly transmitted in accordance with a predetermined sequence.

FIG. 3(2) illustrates types of the transmitted frames when the range of video image to be used is changed from "A" to "B".

In this case, at timing "#n", the detection unit 60 detects voice in a direction corresponding to the range of video image to be used "B" that is different from the current range "A", and the detected voice is reported to the DPTZ control unit 50. The report is transmitted via the general control unit 28. Or, the scene change detection unit 51 detects that a person appears in the range of video image to be used "B", and reports the detection to the DPTZ control unit 50. The DPTZ control unit 50 determines that the range of video image to be used is changed from "A" to "B".

The DPTZ control unit 50 waits until the second video image frame is transmitted, then, changes the range of video image to be used from "A" to "B".

Specifically, the DPTZ control unit 50 generates the second video image frame in which the range of video image to be used is changed from "A" to "B". The DPTZ control unit 50 transmits the generated second video image frame to the encoder 16 via the image processing unit 15.

In the example presented as FIG. 3(2), the second video image frame F2 is transmitted to the video image processing apparatus 1 of the communication counterpart at timing "#n+3", and the DPTZ control unit 50 sets the range of video image to be used in the second video image frame at "#n+3" to be "B". Additionally, in a case where the video image processing apparatus 1 is used for monitoring, etc., a light may light at the timing when the range of video image to be used is changed.

According to the operation process described above, the encoding efficiency is not degraded because the encoder 16 changes the range of video image to be used in the frame encoded by using intra-frame prediction. That is, a number of the second video image frames does not increase because the range of video image to be used is changed in the frame that is reported, in advance, to be transmitted as the second video image frame. Therefore, the degradation of the transmission efficiency due to increase of the second video image frames can be avoided.

Similar to FIG. 3(2), FIG. 3(3) also illustrates types of the transmitted frames when the range of video image to be used is changed from "A" to "B".

In FIG. 3(3), "the change of the range of video image to be used", which cannot be controlled by the DPTZ control unit 50 occurs.

For example, "the change of the range of video image to be used, which cannot be controlled by the DPTZ control unit 50" occurs in a case where the camera 10 is moved, or a light is lit at timing when a person is detected.

In FIG. 3(3), the range of video image to be used is changed from "A" to "B" in the video image frame at #3. In this case, during a predetermined period, the DPTZ control unit 50 generates the same video image frames as the video image frame at #3. In the example presented as FIG. 3(3), the video image frames from #3 to #n are the same. Thus, the DPTZ control unit 50 generates the same video image frames. Therefore, the video image displayed in the video image processing apparatus 1 of the communication counterpart becomes a still image during the predetermined period.

Additionally, the DPTZ control unit 50 or the general control unit 28 preferably instructs the encoder 16 to treat the video image frame at #3 as the second video image frame.

According to the operation process described above, the DPTZ control unit 50 transmits the same video image frames during the predetermined period in a case where "the change of the range of video image to be used, which cannot be controlled by the DPTZ control unit 50" occurs. The degradation of the encoding efficiency can be suppressed because the encoder 16 performs the encoding operation on the same video image frame. The encoding operation for generating the second video image frame is performed at the first frame (that is, frame at #3) of the same video image frames. However, the degradation of the encoding efficiency can be suppressed because the DPTZ control unit 50 generates the same video image frames during a predetermined period after #4.

(4) Generation of Displayed Image

A process for generating a video image frame to be input into the encoder 16 based on the video image captured by the camera 10 will be described with reference to FIG. 4.

In the present embodiment, the camera 10 generate the video image, while the DPTZ control unit 50 generates the video image frame from the range of video image to be used. The generated video image frame is encoded.

The video image may be distorted because the camera 10 captures a wide range of the video image by using the wide-angle lens 10A. The image processing unit 15 performs a distortion correction operation on the video image frames generated by the DPTZ control unit 50 to correct the distortion. The above described correction operation is referred to as AFFINE transformation.

The image processing unit 15 includes an AFFINE transformation map for performing the distortion correction operation. The AFFINE transformation map records processes in the AFFINE transformation to be performed on respective pixels of the video image captured with the wide-angle lens. By performing the processes on the respective pixels, the distortion is corrected.

The range of video image to be used is determined based on a size of the video image frame, a position of a speaker (person) in the video image, and the like.

Figure 4:
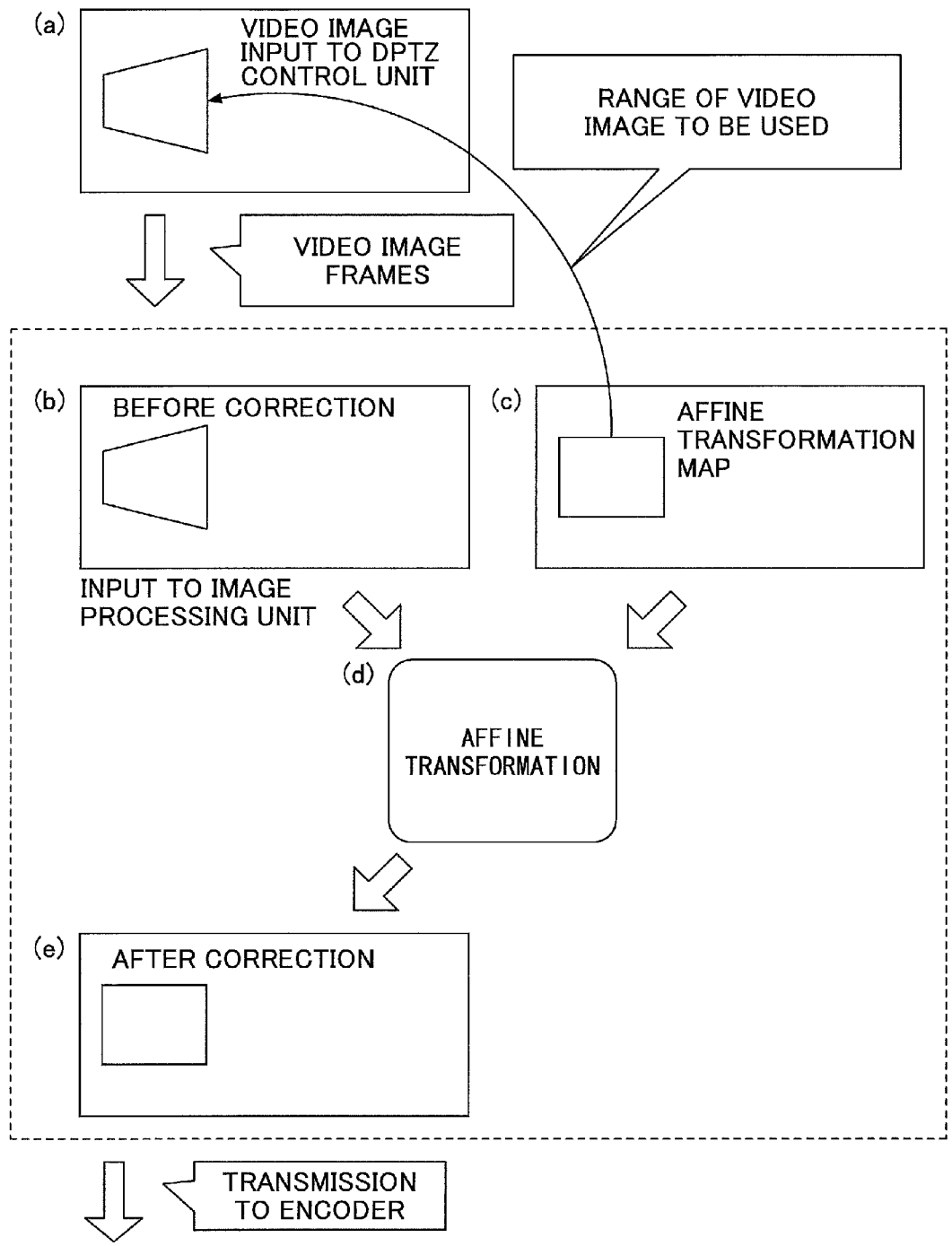
FIG. 4 is a diagram illustrating processes performed in an image processing unit.

As illustrated in FIG. 4(*a*), the DPTZ control unit 50 generates the video image frame based on the captured video image and the range of video image to be used designated by the general control unit 28. Specifically, the DPTZ control unit 50 generates the video image frame by extracting the image corresponding to the designated range of video image to be used from the captured video image. The DPTZ control unit 50 transmits the generated video image frame to the image processing unit 15. Additionally, the DPTZ control unit 50 may acquire coordinate information indicating the range of video image to be used from the image processing unit 15. The coordinate information is determined by the image processing unit 15 based on the range of video image to be used, a display size of the video image frame, and the like.

As presented as FIG. 4(*b*), the video image of the video image frame generated by the DPTZ control unit 50 is distorted. In order to correct the distortion, the image processing unit 15 performs the AFFINE transformation on the video image frame by using the AFFINE transformation map (FIGS. 4(*b*), (*c*), and (*d*)).

A video image frame is generated, in which the distortion of the video image has been corrected, through the AFFINE transformation (FIG. 4(*e*)). The video image frame in which the distortion has been corrected is transmitted to the encoder 16 to be encoded therein.

<Hardware Configuration>

Figure 5:
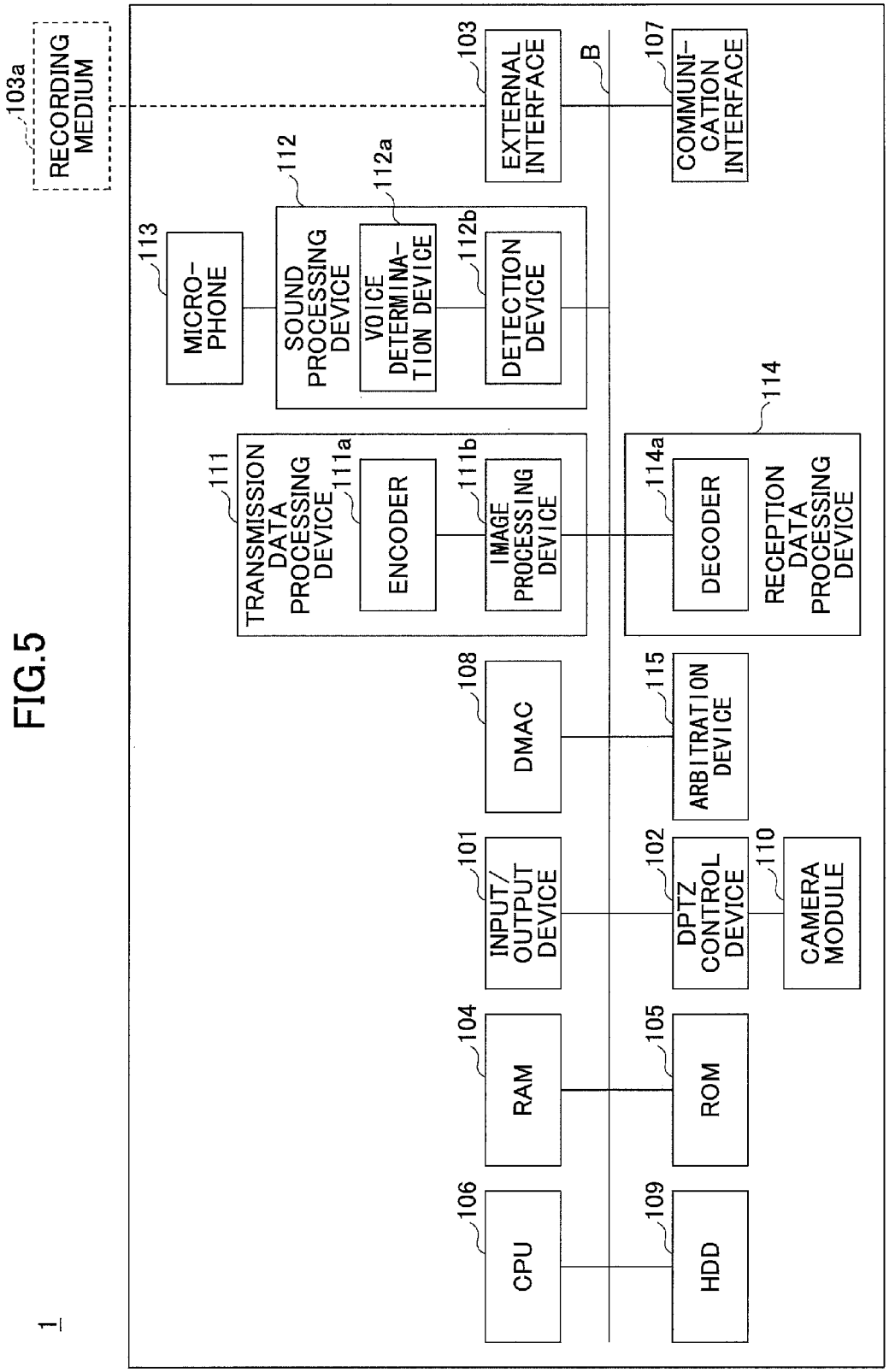
FIG. 5 is an example hardware configuration of the video image processing apparatus.

For example, the video image processing apparatus 1 has a hardware configuration as illustrated in FIG. 5.

The video image processing apparatus 1 includes an input/output device 101, a DPTZ control device 102, an external interface 103, a RAM 104, a ROM 105, a CPU 106, a communication interface 107, a DMAC (Direct Memory Access Controller) 108, a HDD 109, a camera module 110, a transmission data processing device 111, a sound processing device 112, a microphone 113, a reception data processing device 114 and an arbitration device 115, where the respective devices are connected through a bus B.

The input/output device 101 displays the video image frame transmitted from the video image processing apparatus 1 of the communication counterpart by using LED, and the like. The input/output device 101 outputs the sound transmitted from the video image processing apparatus 1 of the communication counterpart by using the speaker. The input/output device 101 includes an interface for connecting an external monitor and speaker, the video image and sound can be output from the external monitor and speaker through the interface. Also, the input/output device 101 displays a state of the video image processing apparatus 1, and the like.

The input/output device 101 accepts settings, operations, etc., related to the video image processing apparatus 1 from the user of the video image processing apparatus 1.

The communication interface 107 performs communications with the video image processing apparatus 1 of the communication counterpart, the server 30, etc., through a wired or wireless network 40. The communication interface 107 detects a state of the network 40, and determines whether the network 40 is available. Also, the communication interface 107 acquires information related to the video image processing apparatus 1 of the communication counterpart.

Also, the HDD 109 is an example of non-volatile storage device for storing programs and data. The programs and data including an OS as basic software for controlling entire video image processing apparatus 1, application software for providing functions on the OS, etc., are stored. Additionally, a drive device (e.g., solid state drive: SSD) using flash memory as a recording medium may be provided instead of the HDD 109 in the video image processing apparatus 1.

The external interface 103 is an interface for an external device. The external device includes a recording medium 103*a*. Thus, the video image processing apparatus 1 can read and/or write data from/into the recording medium 103*a* through the external interface 103. The recording medium 103*a* includes a flexible disc, a CD, a DVD, a SD memory card, a USB memory, and the like.

The ROM 105 is an example of non-volatile semiconductor memory (storage device) that can hold programs and data after the power is turned off. Programs and data including a BIOS, OS setting, network setting, etc., which are executed when starting the video image processing apparatus 1 are stored in the ROM 105.

The camera module 110 includes a wide-angle lens 10A, and performs capturing operation in accordance with instruction from the CPU 106. The DPTZ control device 102 performs an operation for extracting the range of video image to be used from the video image captured by the camera module 110, and stores the range of video image to be used in the RAM 104 after completing the operation. The DPTZ control device 102 receives a report indicating a detection of sound from a detection device 112*b*, thereby performing the operation for changing the range of video image to be used. Also, the DPTZ control device 102 performs the operation for changing the range of video image to be used according to the changed video image captured by the camera module 110.

The microphone 113 collects sound, and transmits data of the collected sound to the sound processing device 112.

The sound processing device 112 includes a voice determination device 112a and a detection device 112b. The voice determination device 112a determines human voice included in the data of sound collected by the microphone 113, and transmits the determination result to the detection device 112b. The determination device 112b determines whether a sound source of the human voice is changed, and reports the change to the DPTZ control device 102 in a case where it is determined that the sound source has changed.

The transmission data processing device 111 includes an encoder 111a and an image processing device 111b. The image processing device 111b performs the AFFINE transformation, etc., on the range of video image to be used in the video image generated by the DPTZ control device 102. The encoder 111a encodes data of the range of video image to be used and sound data. The transmission data processing device 111 transmits the encoded video image data and sound data to the communication interface 107.

The reception data processing device 114 includes a decoder 114a. The decoder 114a decodes the data received from the video image processing apparatus 1 of the communication counterpart via the communication interface 107. The reception data processing device 114 transmits the decoded video image data and sound data to the input/output device 101.

The DMAC 108 provides functions for directly transmitting/receiving data without using the CPU 106 between respective devices included in the video image processing apparatus 1. For example, data of the range of video image to be used processed by the DPTZ control device 102 is stored in the RAM 104, then retrieved from the RAM 104 by the transmission data processing device 111. The transmission data processing device 111 performs an encoding operation and an image processing operation by using the RAM 104. The communication interface 107 acquires the sound data and video image data processed by the transmission data processing device 111 from the encoder 111a, and transmits them to the video image processing apparatus 1 of the communication counterpart. Also, data received from the video image processing apparatus 1 of the communication counterpart via the communication interface 107 is acquired by the reception data processing device 114. The reception data processing device 114 performs a decoding operation by using the RAM 104. The decoded video image data and sound data are acquired from the decoder 114a by the input/output device 101. The input/output device 101 outputs the video image data and the sound data.

Additionally, the DMAC 108 may be provided for each of devices included in the video image processing apparatus 1.

The arbitration device 115 arbitrates operations between devices such as the CPU 106 and the DMAC 108 included in the video image processing apparatus 1, which devices serve as master devices. For example, the arbitration device 115 arbitrates authority for accessing the RAM 104 and the bus B taking account of entire performance of the video image processing apparatus 1. The RAM 104 is an example of a volatile semiconductor memory (storage device) for temporarily storing programs and data. The RAM 104 stores the data of the range of video image to be used that is extracted by the DPTZ control device 102 from the video image captured by the camera module 110. The RAM 104 provides work memory area for the CPU 106, the transmission data processing device 111 (encoder 111a and image processing device 111b), and the reception data processing device 114 (decoder 114a). The RAM 104 may provide the work memory area for the sound processing device 112.

The CPU 106 is a processor for achieving controls and functions of entire video image processing apparatus 1 by retrieving the programs and data from the ROM 105, HDD 109, etc., to load the programs onto the RAM 104 and execute the programs.

Respective functions of the video image processing apparatus 1 illustrated in FIG. 1 are achieved by operating hardware of the video image processing apparatus 1 illustrated in FIG. 5 in a manner described below.

The DPTZ control unit 50 is achieved by operating the CPU 106 and the DPTZ control device 102 in accordance with the program stored in the ROM 105, or the like.

The image processing unit 15 is achieved by operating the CPU 106 and the image processing device 111b in accordance with the program stored in the ROM 105, or the like.

The encoder 16 is achieved by operating the CPU 106 and the encoder 111a in accordance with the program stored in the ROM 105, or the like.

The network processing unit 17, the network state detection unit 20 and the counter station function determination unit 22 are achieved by operating the CPU 106 and the communication interface 107 in accordance with the program stored in the ROM 105, or the like.

The voice determination unit 24 is achieved by operating the CPU 106 and the voice determination device 112a in accordance with the program stored in the ROM 105, or the like.

The detection unit 60 is achieved by operating the CPU 106 and the detection device 112b in accordance with the program stored in the ROM 105, or the like.

The decoder 18 is achieved by operating the CPU 106 and the decoder 114a in accordance with the program stored in the ROM 105, or the like.

The general control unit 28 is achieved by operating the CPU 106 in accordance with the program stored in the ROM 105, or the like.

The camera 10 is achieved by operations of the camera module 110. The microphone array 26 is achieved by operations of the microphone 113. The display 12 and the speaker 13 are achieved by operations of the input/output device 101.

Correspondence between the respective functions and hardware of the video image processing apparatus 1 described above is not a limiting example. A part of functions may be also achieved by executing programs stored in the ROM, or the like. Further, a part of functions may be achieved by dedicated hardware (not by programs).

<Operation Process>

(1) Operation Process—1

In the following, an operation process of an embodiment of the present disclosure will be described with reference to FIG. 6. FIG. 6 is a flowchart illustrating an example operation of the present embodiment in a case where the range of video image to be used changes in the second video image frame.

In step S601, the user of the video image processing apparatus 1 performs an initial setting operation for the video image processing apparatus 1. Thus, the video image can be captured by the camera 10.

In step S602, the user of the video image processing apparatus 1 sets a capturing mode of the camera 10. For example, the user sets the capturing mode of the camera 10 such as a photometry condition.

In steps S603, the video image processing apparatus 1 transmits a connection request to the video image processing apparatus 1 of the communication counterpart, thereby performing processes related to starting TV conference. The video image processing apparatus 1 may start performing the processes related to starting TV conference in response to receiving the connection request from the video image processing apparatus 1 of the communication counterpart.

In step S604, the video image processing apparatus 1 starts a direction fixing timer. The direction fixing timer is provided for suppressing frequent changes of the range of video image to be used in the video image captured by the camera 10. The range of video image to be used may frequently change in a case where a TV conference in which many people are participating is held and a function for following speaker movement is activated in the video image processing apparatus 1. The participants of the TV conference may feel strange in a case where the range of video image to be used changes frequently.

Therefore, the direction fixing timer is started to suppress the frequent changes of the range of video image to be used. The duration of time for the direction fixing timer can be set by the user of the video image processing apparatus 1 or by the user of the video image processing apparatus 1 of the communication counterpart.

In steps S605, in a case where the detection unit 60 detects a human voice (Yes in step S605), the process proceeds to step S606. In a case where the human voice is not detected (No in step S605), the process returns to step S605.

In step S606, the detection unit 60 reports the detection of the human voice to the general control unit 28. The report includes information indicating the position of the person who is speaking. The general control unit 28 determines whether the position of the person who is speaking is included in the current range of video image to be used. In a case where the position of the person who is speaking is included in the current range of video image to be used (Yes in step S606), the process returns to step S605. On the other hand, in a case where the position of the person who is speaking is not included in the current range of video image to be used (No in step S606), the general control unit 28 instructs the DPTZ control unit 50 to change the range of video image to be used. The DPTZ control unit 50 performs a process of step S607.

Additionally, the detection unit 60 may report the detection of the human voice to the DPTZ control unit 50, and the DPTZ control unit 50 may determine whether to change the range of video image to be used.

In step S607, the DPTZ control unit 50 determines whether the type of the video image fame to be generated is the second video image frame.

In a case where the type of the video image frame to be generated as the next frame is a second video image frame (Yes in step S607), the process proceeds to step S608. On the other hand, in a case where the type of the video image frame to be generated as the next frame is not a second video image frame (No in step S607), the process returns to step S605.

In step S608, the DPTZ control unit 50 determines whether the direction fixing timer is expired. In a case where the direction fixing timer is expired (Yes in step S608), the process is forwarded to step S609. On the other hand, in a case where the direction fixing timer is not expired, the process returns to step S605.

In step S609, the DPTZ control unit 50 changes the range of video image to be used based on information detected by the detection unit 60. The process returns to step S604 after the range of video image to be used is changed.

(2) Operation Process—2

In the following, another operation process of the present embodiment will be described with reference to FIG. 7. FIG. 7 is a flowchart illustrating an example operation of the present embodiment in a case where the video image captured by the camera 10 is changed due to direction change of the camera 10, light, and the like.

Step S701 to step S703 are similar processes to step S601 to step S603. Therefore, descriptions thereof are omitted.

In step S704, the scene change detection unit 51 detects the change in the video image captured by the camera 10. In a case where the change in the video image captured by the camera 10 is detected (Yes in step S704), the process is forwarded to step S705. On the other hand in a case where the change in the video image captured by the camera 10 is not detected, the process returns to step S704 to check the change in the video image again. The process of step S704 may be repeated at predetermined intervals.

In step S705, the DPTZ control unit 50 reports the encoder 16 that the frame of video image transmitted to the encoder 16 is to be encoded as the second video image frame.

In step S706, the DPTZ control unit 50 generates N frames of the same video image frames including the frame at which the change of the video image has been detected. The displayed video image becomes still image during the N frames since the same video image frames are generated. The number "N" may be set taking into account the bandwidth of network path between the video image processing apparatus 1 and the video image processing apparatus 1 of the communication counterpart.

Additionally, in parallel with the process of step S706, the video image processing apparatus 1 may adjust the capture mode of the camera 10 such as a photometry condition, etc., according to environment after the video image has been changed.

In the operation process described above, the second video image frame may increase by 1, which may cause to use the bandwidth of the network exceeding a predetermined amount temporarily. However, the degradation of the transmission efficiency can be suppressed because the N same video image frames are generated. Even if the bandwidth used by transmitting the video image frames to the video image processing apparatus 1 of the communication counterpart exceeds the predetermined amount, a circuit termination during the TV conference due to the use of excessive bandwidth can be avoided as long as the overuse is temporal.

Additionally, the operation process described above can be applied to monitoring purpose. In a case where the operation process is applied to the monitoring purpose, the range of video image to be used changes in response to detecting the appearance of a person in addition to detecting a human voice.

<Other>

Although, in the embodiments described above, the video image processing apparatus 1 is used, for example, to provide TV conference and monitoring, the video image processing apparatus 1 may also be used for other purposes. A high transmission efficiency can be maintained by using the video image processing apparatus 1 described above in which encoding operation of the video image frames is improved.

A recording medium storing software program codes for achieving the functions described above may be provided to the video image processing apparatus 1. The embodiments described above can be also achieved by executing the program codes stored in the recording medium by the video image processing apparatus 1. In this case, the program codes retrieved from the recording media themselves achieve the functions of the above described embodiments, and the recording medium storing the program codes corresponds to any of the embodiments. The recording medium may be a storage or non-temporary storage.

Also, the above described embodiments may not be achieved only by executing the program codes retrieved in a computer apparatus. The operating system (OS) installed in the computer apparatus may perform a part of or all of actual processes in accordance with instructions of the program codes. Further, the functions of above described embodiments may be achieved by the performed processes.

Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2015-142504 filed on Jul. 16, 2015, the entire contents of which are hereby incorporated herein by reference.

What is claimed is:

1. A video image processing apparatus comprising:
    a generation unit configured to generate a video image frame from an image area to be used included in a video image captured by a camera, a spatial area in the video image being defined by the image area to be used;
    an encoding unit configured to encode the video image frame into any one of a first video image frame and a second video image frame, wherein the first video image frame is generated through an encoding operation using inter-frame prediction, and the second video image frame is generated through an encoding operation using intra-frame prediction; and
    a detection unit configured to detect a trigger for changing the image area to be used to report the detection of the trigger to the generation unit, wherein the encoding unit reports a encoded video image frame type indicative of any one of the first video image frame and the second video image frame to the generation unit in advance, and in response to receiving the detection of the trigger, the generation unit changes the image area to be used in a video image frame based on the reported encoded video image frame type.

2. The video image processing apparatus according to claim 1, wherein the generation unit changes the image area to be used in the video image that is encoded into the second video image frame.

3. The video image processing apparatus according to claim 1, wherein
    in response to receiving the detection of the trigger, the generation unit changes the image area to be used, and transmits a report indicating the change of the image area to be used to the encoding unit; and
    in response to receiving the change of the image area to be used, the encoding unit encodes the video image frame, in which the image area to be used has been changed, into the second video image frame.

4. The video image processing apparatus according to claim 3, wherein the generation unit generates a predetermined number of video image frames subsequent to the video image frame in which the image area to be used has been changed, and wherein the same video image as the video image of the video image frame, in which the image area to be used has been changed, is used as video images for the predetermined number of video image frames.

5. The video image processing apparatus according to claim 1, wherein the trigger is an occurrence of sound.

6. The video image processing apparatus according to claim 1, wherein the trigger is an appearance of a person.

7. A non-transitory computer-readable recording medium having stored therein a program for causing a computer to perform a method comprising:
    generating video image frame from an image area to be used included in a video image captured by a camera, a spatial area in the video image being defined by the image area to be used;
    encoding the video image frame into any one of a first video image frame and a second video image frame, wherein the first video image frame is generated through an encoding operation using inter-frame prediction, and the second video image frame is generated through an encoding operation using intra-frame prediction, and wherein a encoded video image frame type indicative of any one of the first video image frame and the second video image frame is reported advance;
    detecting a trigger for changing the image area to be used to report the detection of the trigger;
    changing the image area to be used in a video image frame based on the reported encoded video image frame type in response to receiving the detection of the trigger.

* * * * *